March 14, 1933.　　　L. B. GREEN　　　1,901,028
WATER HEATER FOR COFFEE MAKING
Filed March 24, 1932　　　3 Sheets-Sheet 1

Inventor:
Lee B. Green
by Albert Scheible
Attorney

March 14, 1933.   L. B. GREEN   1,901,028
WATER HEATER FOR COFFEE MAKING
Filed March 24, 1932   3 Sheets-Sheet 3

Inventor:
Lee B. Green
by Albert Scheible
Attorney

Patented Mar. 14, 1933

1,901,028

UNITED STATES PATENT OFFICE

LEE B. GREEN, OF LAKEWOOD, OHIO, ASSIGNOR TO THE GLOBE MACHINE & STAMPING COMPANY, OF CLEVELAND, OHIO, A CORPORATION OF OHIO

WATER HEATER FOR COFFEE MAKING

Application filed March 24, 1932. Serial No. 600,877.

My invention relates to a liquid heater adapted to be connected to a liquid supply pipe, and arranged for affording a continuously available supply of heated liquid at an approximately constant temperature without requiring any manual operations for controlling either the replenishing of the water supply or the heating of the water.

In some of its general objects, my invention aims to provide a liquid heater of this class which will normally store a supply of the heated liquid, which will automatically replenish this supply without cooling the stored liquid whenever some of the latter has been drawn off and without cooling the remainder of the stored liquid; and which will have a large capacity for supplying the hot liquid, in proportion to the size of the heater.

In some further objects, my invention aims to provide a liquid heater of this class which can readily be adjusted as to the temperature of the stored liquid, which will permit this temperature to be close to the boiling point of the liquid without emitting any material amount of vapor from the heater; and which can readily be adjusted so as to eliminate substantially all of the air from the liquid.

More particularly, my invention aims to provide an electric heater of this class in which the entering liquid is vaporized and de-aerated either entirely or to a substantially controlled extent before this liquid is added to the store of available heated liquid in the heater; and in which the heating, vaporizing and de-aerating can be effected with a relatively low consumption of current and of time.

Furthermore, my invention aims to provide an electric heater of the above general types in which both the current and the supply of water to the heater will be automatically and conjointly controlled according to the level of the stored heated liquid; and in which the rate of liquid supply can easily be adjusted according to the temperature and pressure of the available source of liquid and according to the capacity of the electric heating member.

In addition, my invention aims to provide a liquid heater of the above mentioned type which will enable various parts to be mounted respectively in different sections of the heater, which will allow needed adjustments to be made without disassembling any parts, which will permit a convenient separation of these parts without a substantial disassembling of the heater, and which will be easily cleaned.

In one of its commercial aspects, my liquid heater of my invention is highly advantageous for lunch rooms, drug stores and the like in providing a continuously available supply of hot water at a suitable temperature as the liquid constituent of hot beverages, since it entirely avoids the decided temperature variations which occur in an ordinary beverage heater, such as a coffee urn, when the replenishing of the liquid is effected by introducing either steam or water in the heretofore customary manner.

Moreover, the de-aerating action in my heater when adjusted for this purpose, makes it particularly suitable for use in connection with certain quickly soluble beverage ingredients. For example, coffee which has been previously boiled and thereafter evaporated is now available in the form of minute crystals which will dissolve almost instantly in hot water. With such a coffee preparation, the palatability of the beverage is undesirably effected by oxygen, so that the resulting beverage coffee is decidedly improved when the water has first been boiled sufficiently to expel the air from it.

My present invention meets this requirement by providing a liquid heater in which the replenishing water not only is preheated, but also is boiled so to expel the occluded air from it, and in which the condensing of the resulting vapor affords the needed additions to the supply of hot consumption water. Moreover, my invention provides an arrangement for this purpose which will accomplish this evaporation and de-aeration without splashing any appreciable quantity of still aeration water into the consumption water chamber, without allowing the vapor to build up a pressure in the heater, and without the escape of any material quantity of steam from the heater.

Generally speaking, I accomplish these important objects in the following manner:

(1) By first passing cold water, in quantities corresponding to those drawn from the maintained temperature water chamber of the heater, through a water-heating receptacle and heating the water within this receptacle sufficiently to raise the upper portion of this water to its vaporizing point.

(2) By admitting the water at the bottom of this receptacle and at a rate proportioned to the heating capacity of a heating member within this receptacle.

(3) By having this heating member extend vertically for the greater portion of the height of the receptacle but with its upper end below the level of the water in the receptacle.

(4) By so proportioning the heating member and the rate of water admission to the capacity of this receptacle that the rise of vapor bubbles within the water, together with the upward pressure of the admitted water will be insufficient for splashing water out of the receptacle, when a de-aerizing of the water is needed.

(5) By having this water-heating receptacle in heat-conducting relation to the hot water in the said water chamber, and extending considerably above the maximum level of the hot water in that chamber.

(6) By automatically controlling the supply of additional water to the water-heating receptacle so as to keep the level of the consumption water at an approximately constant height considerably below the top or outlet of the said receptacle, and also below the upper end of the heating member.

(7) By disposing a baffle for limiting the upward surging of the boiling water to a relatively small height above the top of the tube, if the rate of water admission to the receptacle is greater than that needed for completely de-aerizing the water.

(8) By starting and stopping the operation of the heating member conjointly with the starting and stopping of the additional supply of water to the water-heating receptacle.

(9) By providing convenient means for adjusting the level at which the stored hot water is maintained; and also for adjusting the rate at which water will flow into the receptacle.

(10) By providing a vapor vent with its inlet disposed so that liquid cannot splash into the vent, and with this inlet below the level of most of the uncondensed vapor.

(11) By effectively insulating both the heated (consumption) water and the water in the said receptacle against radiation to the outer air.

(12) By providing an unheated base section for housing certain control members and constructing this section to permit ready access to adjusting members.

(13) By providing simple and readily releasable connections between the base section and the main section of the heater, and between cooperating parts carried by these sections.

Illustrative of a hot water heater embodying these features.

Figures 1, 2, 3, 4, 5:
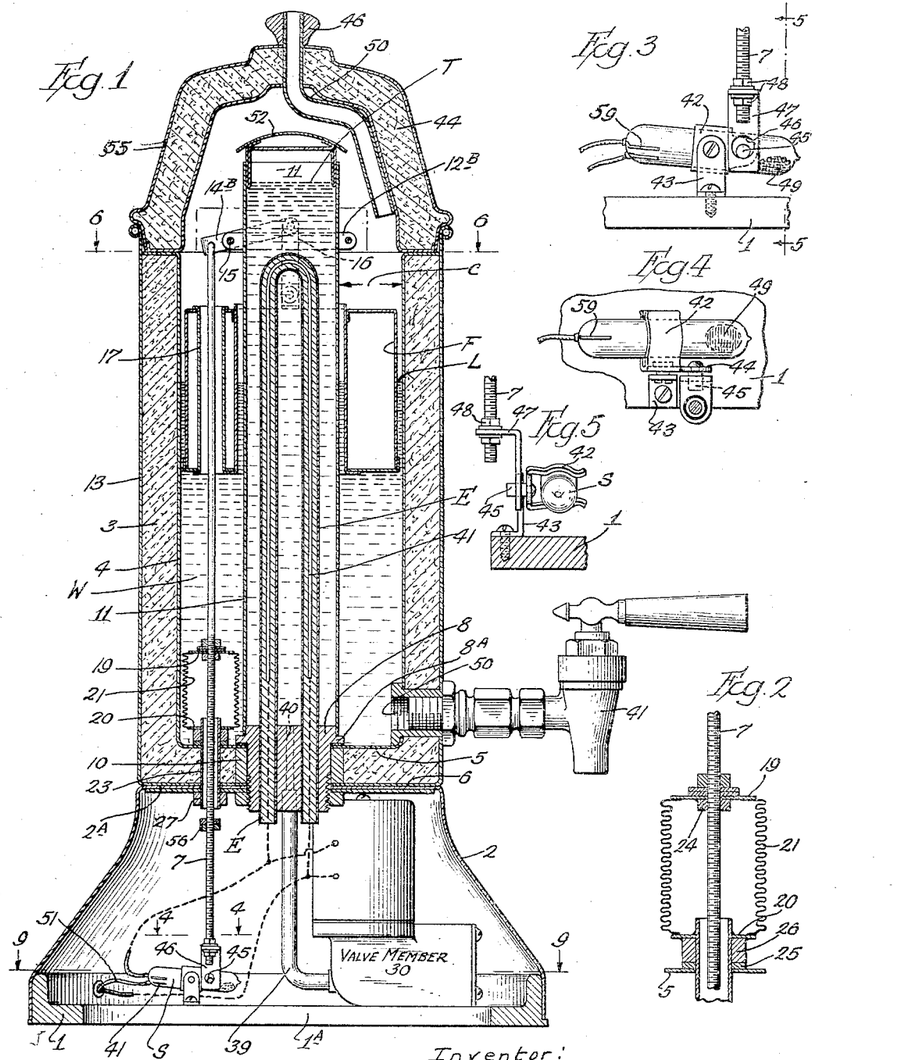
Fig. 1 is a central and vertical section through a hot water heater embodying my invention, with the faucet shown in elevation.
Fig. 2 is an enlargement of a portion of Fig. 1, showing the flexible bellows which seal the control rod to the bottom of the main section of my water heater.
Fig. 3 is an enlarged side elevation of the electric switch of Fig. 1 and of the operative connections between this switch and the control rod.
Fig. 4 is a plan view of the same parts.
Fig. 5 is an elevation taken from the line 5—5 of Fig. 3.
Figure 9:
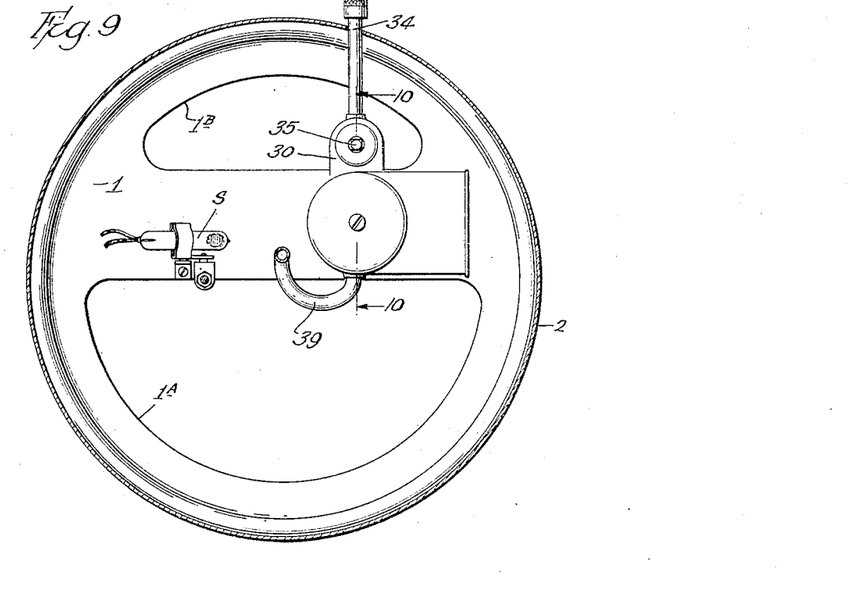
Fig. 9 is a plan view of the base of the heater and of the parts mounted on this base, taken from the line 9—9 of Fig. 1.

In the illustrated embodiment, my hot water heater comprises three superposed sections:

The base section includes a base plate 1 to which the mouth end of an inverted cup-shape shell 2 is attached. Mounted on this base plate 1 and housed by the casing 2 are an electric switch S, and also a twin valve member for metering and controlling the admission of cold water.

The intermediate and main section comprises a double-walled water container, preferably of a cylindrical bore, with a filling of heat-insulating material 3 between the inner tubular riser wall 4 and the outer riser wall 13, which insulating material extends also between the upper and lower container bottom portions 5 and 6. The lower bottom portion 6 is seated on the top 2 A of the shell of the base section, and the container bottom as well as the base shell top 2 A are provided with an upright central bore, and also with a relatively smaller upright bore through which an upright control rod 7 extends from the switch to a float-controlled lever 14 within the container of the main section.

Extending through the central bore in the container bottom and the base shell top is a plug 8 which has a peripheral flange 8 A overlying the upper part 5 of this container bottom. This plug is clamped against the lower container bottom 6 by a nut 9 threaded on the lower end of the plug, thereby rigidly connecting the container to the base section and sealing the plug to the bottom of the container. To prevent the tightening of this plug from compressing the heat-insulating filling in the container bottom, I desirably provide a spacer tube 10 sleeved upon the plug 8 and rigidly spacing the upper and lower container bottom parts 5 and 6 from each other.

Sleeved upon the upper end of the plug 8 and seated on the plug flange 8 A is an upright and upwardly open tube 11 which desirably extends upwards beyond the top of the said container, and into the bottom of which tube water is admitted through an upright bore 12 in the said plug. The plug 8 also supports an electric heating member generally designated as E within and freely spaced from the tube 11, the upper end of this heating member being spaced downwardly from the upper end of this tube, desirably by a distance not less than the interior diameter of the tube. Thus arranged, the tube 11 and the upper portion of the plug form a receptacle in which the water is heated, and the annular space C between the tube and the inner riser wall 4 of the container forms a consumption water chamber to receive hot water which has boiled over the top of the said receptacle.

Rigidly mounted within the container is a lever support 12, which desirably is clamped to the tube 11 in such a manner that it can be adjusted as to its elevation, and upon which lever support the rocking lever (generally designated as 14) is pivoted on a horizontal pivot pin 15. Depending from one arm 14 A of this lever and desirably connected to two counterpart portions of this lever arm by links 16 disposed at opposite sides of the tube 11, is a float F which is freely spaced both from the said tube and from the inner tubular container wall 4. This float is desirably of a hollow cylindrical type and has an upright tube 17 extending through it, which tube underhangs the other (and preferably shorter) arm 14 B of the rocking lever, and through which tube the switch-controlling rod 7 extends.

Figures 6, 7, 8, 11:
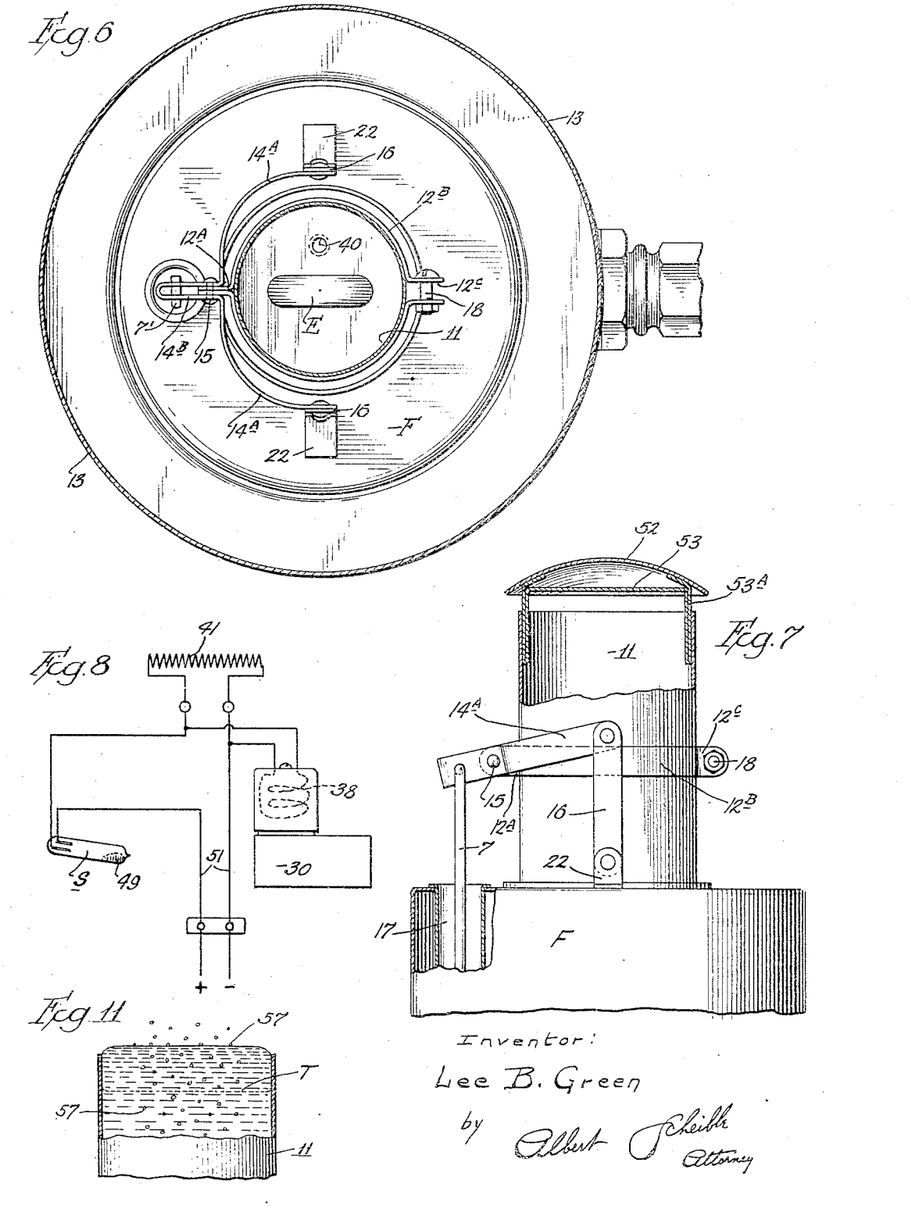
Fig. 6 is an enlarged section taken along the line 6—6 of Fig. 1.
Fig. 7 is an enlarged elevation of upper portions of the central water heating tube and of the float, with parts of both broken away.
Fig. 8 is a diagram of electric circuit connections.
Fig. 11 is an elevation of the upper end of the central water heating tube, partly broken away, showing the water in this tube and some of the convection bubbles as they appear when my heater is adjusted for de-aerating the water.

As here shown, the lever 14 consists of a metal strip doubled flatwise to form a U-sectioned end 14 B to which the upper end of the control rod 7 is pivoted (as by having the horizontally turned upper end 7 of the said rod extend through the said doubled lever end) and twin lever arms 14 A from each of which one of the float-supporting links 16 depends. These links are preferably diametrically opposite each other with respect to the common axis of the float and the tube 11 so as to balance the float against tilting, and each link has its lower end pivoted to a bracket 22 welded to the top of the float.

The support for this lever comprises two clamp halves 12 B having overlapping ends 12 A extending into the U portion 14 A of the lever and connected to the lever by the pivot pin 15, and a bolt 18 connecting the other ends 12 C of the clamp halves to clamp the tube (or receptacle riser wall) 11 between them. Extending through the container bottom and the base shell top 2 A is an upright pipe 23 through which the control rod 7 extends, and this tube is sealed to the control rod, preferably by a sealing member which is so flexible as to offer no appreciable resistance to the longitudinal (and hence vertical) movement of the rod. For this purpose, I am here showing the sealing member as comprising a top 19 clamped to the control rod, a bottom 20 sealed to a nut 24 which is fastened to the said pipe 23 within the container, and a peripherally corrugated bellows wall 21 (of thin copper or the like) sealed at its opposite ends to the top 19 and bottom 20. The pipe 23 is also sealed to the container bottom, as by a gasket 25 interposed between a nut 26 which cooperates with a lower nut 27 to clamp the pipe to the superposed container bottom and base shell top.

For the water supply controlling valve member, I desirably provide an electromagnetic valve which opens and closes the water connection to the said tube, according to the "off" and "on" positions of the float-controlled switch, together with a manually adjustable throttling valve which merely determines the rate at which the water will flow into the said heating tube.

Figure 10:
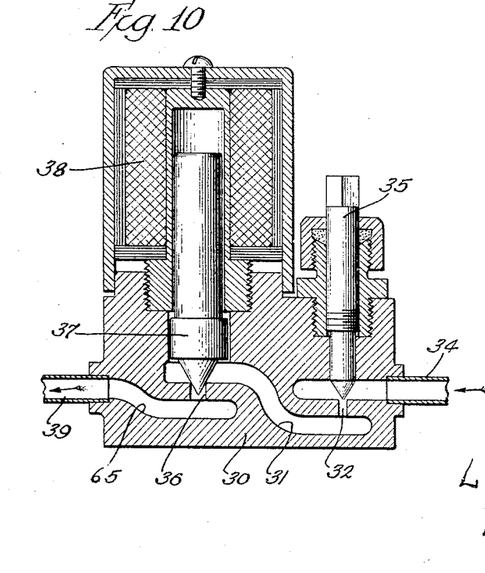
Fig. 10 is an enlarged vertical section through the water-supply controlling member of my heater, taken along the line 9—9 of Fig. 9.

In practice, both of these valves are desirably constructed as a unit, as shown in Figs. 1, 9 and 10. These show a valve body 30 having an interior passage 31 connected by a throttle port 32 to an inlet passage 33 to which water is supplied by a water pipe 34. This port 32 is controlled by a throttle screw 35 threadedly supported by the valve body, so that the maximum rate at which water will be forced through the valve body can be varied by adjusting this screw.

Connecting the interior passage 31 with the outlet passage 65 of the valve body is a second port 36, controlled by the tip of a solenoid core 37 which will seat by gravity to close this port 36 when no current is flowing through the solenoid coil 38. Whenever the latter port is open, water is supplied to the water-heating receptacle by a pipe 39 leading to an upright bore 40 in the plug 8 which forms the bottom of this receptacle.

The solenoid coil 59 is desirably connected in shunt with the heating element 41 of the electric heating member, as shown in Fig. 8, the switch S being in series with the said heating element. To avoid arcing, I desirably employ a switch mechanism having a throw-over action, and I also preferably arrange the operating connection between the control rod 7 and the switch so as to permit both a relative adjustment and an easy disconnection.

For example, I may employ a tiltable mercury switch member in which a globule of mercury 39 rolls into and out of contact with wire terminals 60, this switch member being gripped by a clamp 42 pivoted on a horizontal axis upon a bracket 43 fastened to the base plate 1. The clamp 42 has an arm 44 carrying a pin 45 which extends (parallel to the clamp pivoting axis) into a relatively larger aperture 46 in a bracket 47 clamped to the rod 7 by nuts 48, as shown in Figs. 3 to 5, so that the clearance for the said pin affords a lost motion permitting the switch member to complete its movement in either direction rapidly.

The outlet 50 for the consumption water W in the annular hot water storing chamber O is preferably near the bottom of that chamber and of much greater area than the port 40 through which water is admitted to the inner receptacle, a usual handled faucet 41 being connected to this outlet.

Normally seated on the upper end of the container is a cover 43, which also is double-walled with heat insulation 3 between the walls, and which desirably has its lower end telescoped into the upper part of the outer container wall 12. Extending upwardly through this cover is a vapor vent pipe 50, which preferably has its lower portion extending close to the cover and terminating at an elevation sufficiently lower than the upper end of the water-heating receptacle so that the water splashed out of the receptacle will not be directed into this vent. The vent pipe may have an intermediate portion engaging the cover so that the pipe can be clamped against the cover by a cover-lifting knob 46 which is threaded on the upper end of the vent pipe.

When water is first admitted to a thus arranged water heater (when this is empty), by merely connecting the inlet pipe 34 to a water pipe of the building and also connecting the current supply wires 51 to a lighting circuit, the float will be in the lowermost position in which it raises the control rod 7 to close the switch. Consequently, the solenoid core will be raised to open the port 36, so that the water flowing up into the water-heating receptacle will be heated to its boiling point by the time it reaches the top of the receptacle.

With the heating wire 41 suitably proportioned, the heating of this slowly admitted water will cause the hottest water portions to rise by convection to the upper portion of this receptacle, thereby reducing the time required for evaporation at the exposed surface of the water. Moreover, the vapor bubbles 57 formed at various elevations in the water by the action of the heating member will tend to raise the upper portion of the water while these bubbles are rising to the surface, thereby cooperating with the lifting action of the water admitted upwardly through the plug in raising the level of the water in the tube. With the heating member spaced from the bore of the said tube (or receptacle riser wall), these rising vapor bubbles will mostly be spaced from that bore also, so that the rupturing of the bubbles at the exposed surface of the water will not be at the mouth edge of this tube when the level of the water reaches this mouth end.

Consequently, with easily made adjustments, the top of the water may even arch somewhat above the upper end of the tube, as shown in Fig. 11, when my heater is proportioned and adjusted for effectively vaporizing the surface portion of the water at a temperature slightly below the boiling point of the water.

When thus operating, the vapor bubbles may be quite small, so that they will merely puncture the upper surface of the water, while permitting the surface tension of the liquid to prevent any flow of water over the upper edge of the receptacle; so that the water reaches the annular consumption water chamber only after it has first been vaporized and then condensed, either by the somewhat cooler air above the tube and above the consumption water, or by contact with the cover of my heater.

Since the water when condensing will separate from the air, I thus secure an effective removal of nearly all the air from the water, which would not be the case if the water had been boiled so violently as to splash it over the mouth end of the receptacle. Moreover, since a sufficient rate of evaporation can be obtained, at a temperature somewhat below the boiling point of the water, an operating of my liquid heater in this manner produces steam of such a negligible pressure as not to blow out of the vent tube 50. Consequently, the amount of steam carried out of this vent tube by the rising of the warm air which had been separated from the water is so trifling that it does not appreciably affect the air of the room in which my water heater is used.

If my liquid heater is to be used for purposes where an elimination of air (and hence of oxygen) is not needed, the transfer of liquid from the heating receptacle to the consumption chamber can be effected still more rapidly, by adjusting the throttling screw 35 so that the liquid is admitted more slowly to this receptacle and hence will boil with sufficient violence to splash it over the mouth end of the receptacle. In this case, I may limit the rate of the splashing by providing a baffle 52 which overhangs the mouth end of the receptacle. This baffle preferably is downwardly concaved, and adjustably supported by the receptacle, as by fastening the baffle to a narrow strap 53 which has legs 53 A frictionally engaging the upper portion of the receptacle riser wall or central tube 11.

Thus arranged, the baffle can readily be slid to adjust its spacing from the mouth end of the receptacle so as to vary the rate at which water will be ejected.

Whenever the water in the combustion chamber again reaches the level for actuating the float-controlled switch, the latter opens the switch, thereby discontinuing both the action of the heating member and the supply of water to the central receptacle. Since the upward push of entering water, the lifting action of bubbles in the water and the surges in the water are then annulled, the water level in this receptacle then drops somewhat, as to the level T of Figs. 1 and 11.

However, my liquid heater can also be used advantageously when no de-aeration of the liquid is needed, by merely adjusting the throttling screw 35 so as to reduce the rate at which water is admitted to the riser tube housing the heating element. Such a greater throttling of the water admission will cause the liquid to rise more slowly within the said tube, thereby exposing it longer to the action of the heating member. Consequently, the upper portion of the liquid in the said tube or inner receptacle will boil more or less violently, and much of this liquid will splash over the top of the tube without having been evaporated.

When my heater is used in this manner, the extent of the splashing with any given violence of the boiling can also be controlled to a considerable extent by disposing a baffle 52 above the mouth end of the said inner receptacle, as shown in Fig. 7. This baffle desirably is detachably supported by the riser wall or tube 11 of the receptacle, as by attaching the baffle to an inverted U-shaped strap 53 having its shanks 53 A frictionally engaging the bore of the tube to permit a manual adjustment of its height.

When my heater is used as just described, an opening of the circuit to the heating member by the float-controlled switch soon discontinues the surging of the upper portion of the liquid in the receptacle, so that the liquid level drops to a level T as in Fig. 1, the general adjustments desirably being such that this level is considerably above the upper end of the heating member and that the heating member extends considerably above the normal level L of the consumption water by which the float is affected.

With such a disposition of the parts, the liquid in the upper part of the receptacle normally is considerably hotter than that in its lower portion, so that a relatively small heating effect is required to evaporate or boil the upper part of this preheated liquid when the switch again closes the circuit to the heating member. Indeed, I have found in practice that with a liquid heater proportioned as here illustrated, either the evaporating and de-aerating action or a splash-boiling action can be resumed within less than a half minute after each closing of the switch. This speedy responsiveness, when also accompanied by a reasonably sensitive adjustment of the float mechanism, enables me to secure a large capacity of delivered hot liquid in proportion to the quantity normally stored in the annular chamber C of my heater. For example, with a quart of the hot consumption water normally stored in this chamber, and with the float mechanism arranged for actuating the switch when less than an ordinary coffee cup of water has been drawn from the faucet, my heater will afford a steady supply of the heated water at the rate of two cups per minute.

In addition to having an effective capacity many times higher than that of coffee urns in proportion to its size, my liquid heater also avoids the vitiation of air by steam and by coffee odor, and is entirely automatic in operation. Moreover, my appliance can readily be adjusted so as to vary the difference between the boiling point of the liquid and the temperature of the heated consumption portion of the liquid, this portion being only slightly cooled by conduction from the cooler liquid in the lower part of the liquid preheating receptacle because of the relatively small cross-section of the receptacle in proportion to that of the consumption chamber C.

To facilitate needed adjustments, I desirably provide the base plate 1 with apertures 1 A and 1 B, through which the user can reach certain parts when the heater is propped up off its normal support. For example, if a change in the pressure of the water supplied to the heater through the water inlet pipe 34 makes the faucet-discharged water too hot or too cool, the user can readily reach through one of these apertures to turn the throttling valve 35 in one direction or the other.

These base apertures also permit the user to detach the switch mechanism from the rod 7 by removing the lower nut 48, to detach the circuit wires from the heating member and the solenoid coil, and to detach both the nut 9 on the plug, and the lower nut 27 on the rod-guiding pipe, thereby permitting the entire container section of my heater to be lifted off the base member. Moreover, the user can at any time snap the bent upper rod end 7' out of the rocking lever, after which he can lift the riser tube (or receptacle wall) it out of the container conjointly with the lever and float assembly so as to permit a thorough cleaning of the said tube and of the interior of the container.

However, while I have described my liquid heater in an embodiment designed for affording a constant supply of beverage water, I do not wish to be limited as to the nature of the liquid for which it may be employed. Nor do I wish to be limited to details of the construction and arrangement here disclosed, since many changes might be made without departing either from the spirit of my invention or from the appended claims.

I claim as my invention:

1. A liquid heater comprising a container body and a cover for the same, the container body having an outlet in its lower portion, a smaller diametered receptacle supported within the container and having its riser wall spaced from the riser wall of the container body and disposed to leave a chamber within which heated liquid is normally stored, the said receptacle having a discharge outlet spaced downwardly from the said cover, a liquid supply duct leading to the lower portion of the receptacle, an electric heating member disposed within the receptacle, and control means responsive to variations in the level of the heated liquid in the said chamber for simultaneously controlling the heating member and the flow of liquid through the duct.

2. A liquid heater as per claim 1, in which the control means are arranged for maintaining the said water level at a height considerably below the discharge outlet of the receptacle.

3. A liquid heater as per claim 1, in which the control means are arranged for maintaining the said water level at a height considerably below the discharge outlet of the receptacle, and in which the electric heating member has its upper end at a height below the discharge outlet of the receptacle and above the said water level.

4. A liquid heater as per claim 1, in which the heating member has its upper end spaced downwardly from the discharge outlet of the receptacle by a distance not less than the interior diameter of the upper portion of the receptacle.

5. A liquid heater as per claim 1, in which the control means include a float disposed within the said chamber, an electric switch, an electromagnetic duct-control valve, a circuit operatively connecting the switch with both the electric heating member and the said valve, and a switch-actuating mechanism interposed between the float and the switch.

6. A water heater as per claim 1, in which the control means include a float disposed in the said chamber, an electric switch, an electromagnetic duct-control valve, a circuit operatively connecting the switch with both the electric heating member and the said valve, and a switch-actuating mechanism interposed between the float and the switch; the said mechanism including a rocking lever having one end thereof connected to the float, a lever-pivoting member fast with respect to the receptacle, and a rigid member connecting the other end of the lever with the switch.

7. A liquid heater as per claim 1, including manually adjustable means, independent of the said control means, for throttling the liquid supply duct to limit the rate at which liquid can flow through the said duct.

8. A liquid heater as per claim 1, in which the bottom of the container body has a perforation underhanging the said chamber; and in which the control means include a lever responsive to variations in the said water level, a control rod supported by and depending from the lever, and flexible means sealing the rod to the container bottom.

9. A liquid heater as per claim 1, in which the bottom of the container body has a perforation; and in which the control means include a lever responsive to variations in the said liquid level, a control rod supported by and depending from the lever, and flexible means sealing the rod to the container bottom; the flexible means comprising an upright bellows member sealed at its ends respectively to the rod and to the container bottom.

10. A liquid heater as per claim 1, including a tube extending through the bottom of the container body radially outward of the said receptacle; the control means including a float freely surrounding a portion of the receptacle, a rod extending downwardly through the said tube, instrumentalities interposed between the float and the rod for moving the rod in response to vertical movements of the float, and a flexible sealing member interposed between the rod and the said tube.

11. A liquid heater as per claim 1, in which the bottom of container body has a perforation underhanging the said annular chamber; and in which the control means include a lever responsive to variations in the said water level, a control rod connected to the lever and extending through the said perforation; and means disposed below the said bottom and connected to the rod, whereby vertical movements of the said rod control both the operation of the heating member and the flow of water through the said duct.

12. A liquid heater as per claim 1, including a cover detachably supported by the upper end of the container and having a downwardly flaring conical interior wall disposed for a radially inward deflection of water splashed through the outlet of the receptacle against the said wall.

13. A water heater as per claim 1, including a vent duct supported by the cover and freely spaced from the said receptacle, the vent duct having its lower end at an elevation lower than the upper end of the receptacle.

14. A liquid heater as per claim 1, including a baffle underhanging the cover and spaced upwardly from the discharge outlet of the receptacle for limiting the upward splashing of liquid from the receptacle, the baffle being downwardly concaved and of larger diameter than the upper end of the receptacle.

15. A liquid heater as per claim 1, including a baffle overlying and spaced upward from the receptacle for limiting the height to which boiling liquid surges out of the receptacle, and a baffle-supporting member fast upon the baffle and slidable upon the receptacle to adjust the height of the baffle.

16. A liquid heater as per claim 1, in which the control means include a float disposed in the said chamber, an electric switch, an electromagnetic duct-control valve, a circuit operatively connecting the switch with both the electric heating member and the said valve; and a switch-actuating mechanism interposed between the float and the switch; the water heater including basal shell of inverted cup shape, the container being seated upon and fastened to the top of the said shell, and the said shell housing the said switch and valve.

17. A liquid heater comprising a container, a plug extending through the bottom of the container, an upright and upwardly open tube having its lower end sleeved upon the plug, the said tube being of smaller diameter and less height than the interior of the container; the plug having an upright bore through which water is admitted into the tube, and an electric heating member supported by the plug, the said member including a heating portion disposed entirely within and below the upper end of the tube.

18. A water heater as per claim 1, in which the electric heating member is of an inverted U-shape and has its shanks downwardly through the plug.

19. A liquid heater comprising a container, an upright tube sealed at its lower end to the bottom of the container and having its upper end spaced downwardly from the top of the container, the container having its riser wall freely spaced from the tube and having an outlet in the lower portion of the said wall; a liquid supply duct opening into the lower portion of the said tube, an electric heating member disposed within the tube, an automatic control means for simultaneously controlling the flow of water through the said duct and the operation of the heating member in response to variations in the level of liquid in the container radially outward of the said tube.

20. A liquid heater comprising a container, a base shell including a shell top underlying the bottom of the container, an upright and perforated plug extending through the said shell top and the said container bottom, an upright tube sleeved upon the upper end of the plug, an electric heating member supported by the plug and extending within the said tube and presenting its terminal portions within the said shell, and means associated with the plug for releasably clamping the container bottom to the said shell top.

21. In a liquid heater having a cup-like container having an outlet below the normal level of the liquid, a heating member disposed with the container, an upright tube freely housing the said member and sealed at its lower end to the bottom of the container but open at its top, the upper end of the tube being at higher elevation than the said level, means for supplying liquid to the lower portion of the tube, and control means responsive to the quantity of liquid in the container outward of the said tube for controlling both the supply of liquid and the operation of the heating member, the control means being arranged for continuously maintaining liquid within the said tube at heights above the top of the heating member.

22. In an appliance for heating and de-aerating a liquid which has air occluded in it, an upright container, an upwardly open receptacle centrally disposed within the container and of less height than the interior of the container, the container having an outlet in its lower portion outward of the receptacle and the receptacle having a liquid inlet at its bottom, an electric heating member disposed within the receptacle and having its upper end at lower elevation than the upper end of the receptacle, and adjustable means for controlling the admission of liquid under pressure through the said inlet at such a rate in proportion to the capacity of the receptacle and the wattage of the heating member that the combined effects of the said member and of the upward pushing of liquid in the receptacle by the entering liquid will cause a continuously complete evaporation of the uppermost portion of the liquid.

23. A liquid heating and de-aerating appliance as per claim 22, including means independent of the said adjustable means for simultaneously halting the actuation of the heating member and the admission of liquid to the receptacle when the level of liquid in the container outward of the receptacle reaches a predetermined height, and for simultaneously restarting the said actuation and liquid admission when the said level falls to a predetermined extent.

24. A liquid heater comprising a container, upright partitioning means within the container for dividing the interior of the container into a liquid-preheating chamber and a hot-liquid storing chamber, the upper ends of the said chambers communicating with each other; a heating member within the said preheating chamber; means for forcing cold liquid slowly upward within the preheating chamber; means within the preheating chamber for heating the liquid; and adjustable means whereby the rate of the said upward forcing of the liquid can be controlled so as to cause the heated liquid to be transferred to the said storing chamber either by causing liquid to boil over the upper end of the partitioning means or by evaporating liquid in the preheating chamber and permitting the resulting vapor to condense in the storing chamber.

25. In a liquid heater, a liquid heating compartment and a hot liquid storing compartment, means for heating liquid while flowing within the said heating compartment, and control means for regulating extent of the heating on the said flowing liquid; the said control means being adjustable so that the liquid may either be transferred in liquid form from the heating compartment to the liquid storing compartment, or may be vaporized and de-aerated from the heating compartment and thereafter condensed within the heater into the said storing compartment, substantially as shown and described.

Signed at Cleveland, Ohio, March 17th, 1932.

LEE B. GREEN.